United States Patent
Grafton

(10) Patent No.: US 6,181,482 B1
(45) Date of Patent: Jan. 30, 2001

(54) VARIABLE RATIO ANAMORPHIC LENS

(75) Inventor: David A. Grafton, Santa Monica, CA (US)

(73) Assignee: News America Incorporated, New York, NY (US)

( * ) Notice: Under 35 U.S.C. 154(b), the term of this patent shall be extended for 0 days.

(21) Appl. No.: 09/392,065

(22) Filed: Sep. 8, 1999

(51) Int. Cl.[7] .......................... G02B 13/12; G02B 13/08; G02B 15/02

(52) U.S. Cl. .......................... 359/670; 359/668; 359/672; 359/673

(58) Field of Search .................................. 359/668, 670, 359/672, 673, 674

(56) References Cited

U.S. PATENT DOCUMENTS

| | | | |
|---|---|---|---|
| 3,644,037 | 2/1972 | Larraburu | 355/52 |
| 3,682,533 | 8/1972 | Vetter | 350/181 |
| 3,990,785 | 11/1976 | Hirose | 350/181 |
| 4,017,160 | 4/1977 | Betensky | 350/182 |
| 4,805,998 | 2/1989 | Chen et al. | 350/420 |
| 5,184,880 | * 2/1993 | Lisziewicz | 359/668 |
| 5,668,666 | 9/1997 | Suzuki | 359/674 |
| 5,930,050 | 7/1999 | Dewald | 359/670 |

* cited by examiner

*Primary Examiner*—Georgia Epps
*Assistant Examiner*—Michael A. Lucas
(74) *Attorney, Agent, or Firm*—Blakely Sokoloff Taylor & Zafman LLP

(57) ABSTRACT

An anamorphic lens attachment to be used in conjunction with a basic lens. The attachment provides a variable anamorphic ratio. The attachment comprises a first lens group having positive refractive power in a first direction, a second lens group having negative refractive power in the first direction, and a third lens group having positive refractive power in the first direction. The second lens group is movably located between the first lens group and the basic lens. The third lens group is located between the second lens group and the basic lens at a fixed distance from the first lens group. The lens groups of the attachment have neutral refractive power in a second direction substantially perpendicular to the first direction.

20 Claims, 8 Drawing Sheets

VARIABLE RATIO ANAMORPHIC LENS

BACKGROUND OF THE INVENTION

1. Field of the Invention

This invention relates to an anamorphic attachment to be used in conjunction with a basic lens.

2. Background Information

A picture has an aspect ratio, which is the ratio between the image width and height. Motion pictures were originally recorded on film where the image area had an aspect ratio of 4:3 (1.33:1), sometimes referred to as academy ratio. To accommodate the addition of a soundtrack, the standard ratio for filming was adjusted slightly to be 1.37:1. Television also uses a 4:3 aspect ratio.

To enhance the theatrical cinematic experience, various methods have been devised to present a motion picture that is wider than a 4:3 ratio. Some common presentation formats and the percentage increase in width over academy ratio are as follows:

| | | |
|---|---|---|
| CinemaScope ® | 2.55:1 | 192% |
| Panavision ® | 2.40:1 | 180% |
| Super 35 | 2.34:1 | 177% |
| Flat widescreen U.S. | 1.85:1 | 139% |
| High-definition television | 1.78.1 | 134% |
| Flat widescreen Europe | 1.66:1 | 125% |

Presentation of motion pictures with a wide aspect ratio is sometimes accomplished by masking the full frame of the image on the media to be displayed to produce the desired image ratio. This process is often called flat widescreen. While this requires minimum modification to the projector to display a wider image than academy ratio, the object being projected is smaller. This results in a projected image that is not as bright and is of lower quality than an image of the same height projected from the full frame of the display media.

Flat widescreen presentations from film media using modern projectors achieve acceptable quality levels. However, emerging projection technologies for digitally encoded motion pictures use display media that presently cannot provide the resolution of film. The loss of resolution inherent in a flat widescreen process makes masking of the projected object undesirable with such projection technologies.

Another method of presenting a wide motion picture is the anamorphic process. The image to be projected is compressed horizontally to fit in a full frame by using anamorphic optics, or by other means such as electronic image manipulation. The image is then expanded by corresponding anamorphic optics on the projector which provide greater magnification horizontally than vertically to produce the appropriate display aspect ratio. It should be noted that, while it is convenient to speak in terms of compressing when recording and expanding when reproducing along one axis, the same result can be achieved by compressing when recording along one axis and compressing when reproducing along the perpendicular axis. It is also possible to use expansion in both processes rather than compression. Thus, the recording lens may either have a reciprocal anamorphic ratio to the reproducing lens with the anamorphic effect of both applied along the same axis, or both lenses can have the same anamorphic ratio applied along perpendicular axes.

Anamorphic systems produce presentations of a high quality, but the necessity for the additional anamorphic optics increases the cost of the projector. Anamorphic lens attachments generally provide only a single ratio of anamorphic effect. Therefore, a different anamorphic attachment is required to provide the appropriate anamorphic ratio for every format that is to be presented with an anamorphic process.

The use of anamorphic optics to provide a variety of display aspect ratios is particularly beneficial for systems based on emerging digital display technologies because all available resolution of the recording and display media can be utilized. Further, some digital media use ratios other than academy ratio. For example, media with a 1280 by 1024 element resolution has a ratio of 1.25. Without anamorphic optics, a 4:3 ratio image could use only 963 elements vertically, while a 1.85:1 flat widescreen image would use only 692 vertical elements. By using anamorphic optics with an anamorphic ratio of about 1.07:1, a 4:3 ratio image can utilize the full 1024 element vertical resolution.

It would be desirable to use an anamorphic process to display a variety of formats that are wider than academy ratio to enjoy the benefits of brighter images of higher quality without the expense of a large number of anamorphic lens attachments. This is especially desirable for emerging digital projection technologies where all available resolution is needed. Accordingly, there is a need for an anamorphic attachment with a variable anamorphic ratio for use in recording or projecting images with aspect ratios that differ from the aspect ratio of the image area on the recording or display medium.

SUMMARY OF THE INVENTION

An anamorphic lens attachment to be used in conjunction with a basic lens. The attachment provides a variable anamorphic ratio. The attachment comprises a first lens group having positive refractive power in a first direction, a second lens group having negative refractive power in the first direction, and a third lens group having positive refractive power in the first direction. The second lens group is movably located between the first lens group and the basic lens. The third lens group is located between the second lens group and the basic lens at a fixed distance from the first lens group. The lens groups of the attachment have neutral refractive power in a second direction substantially perpendicular to the first direction.

DETAILED DESCRIPTION OF THE INVENTION

For purposes of clarity, the lens assembly described herein refers to lens groups. A lens group is intended to cover a plurality of lens elements or components that work together as a group or a single lens element or component. Each lens element is intended to broadly cover all possible optical components including cemented doublets and triplets.

Figure 1:
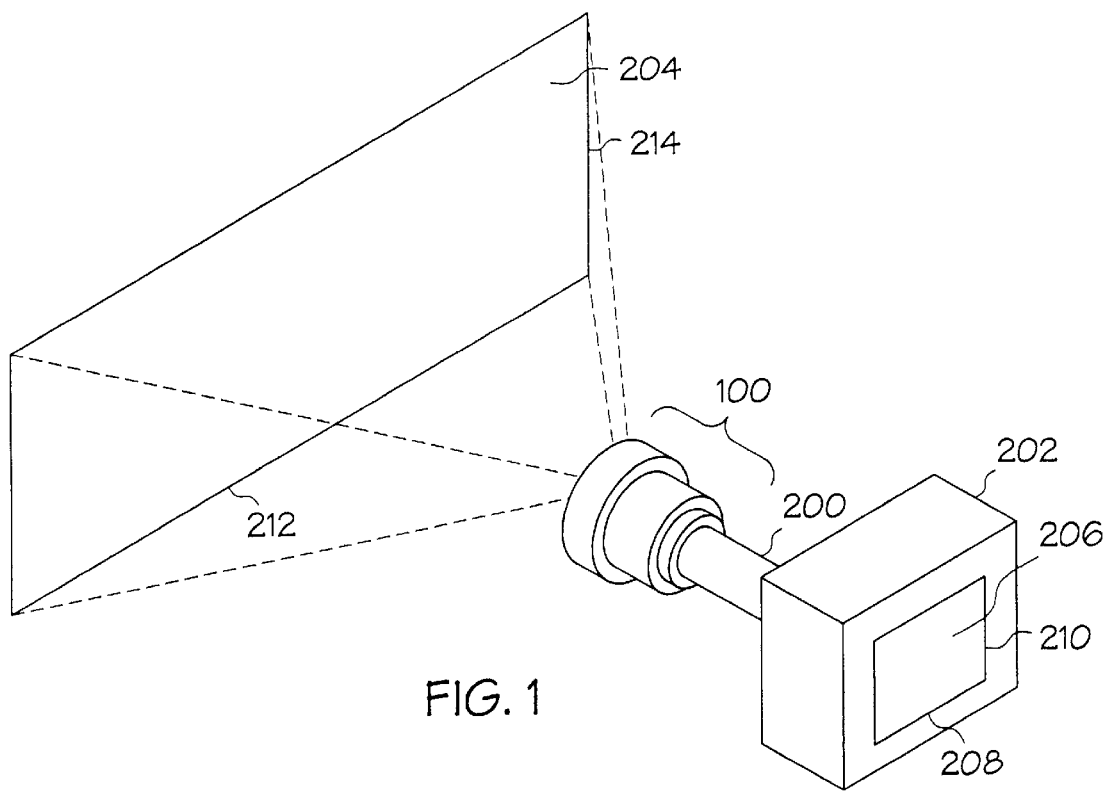
FIG. 1 shows a schematic view of a camera or projector employing the lens attachment of the present invention.

FIG. 1 illustrates a lens attachment 100 that is placed in front of a basic lens 200 to provide a variable anamorphic ratio. In a recording system 202, i.e. a camera, the attachment is placed on the side of the basic lens closest to the object being recorded 204. In a reproduction system 202, i.e. a projector, the attachment is placed on the side of the basic lens closest to the image being produced 204, i.e. a screen.

The lens attachment 100 operates with the basic lens 200 to provide one focal length along one axis such as the horizontal axis and a different focal length along the perpendicular axis such as the vertical axis. As a result the image and the object will have different aspect ratios. If the system shown in FIG. 1 is considered as a projection system, an object 206 is projected through the basic lens 200 and the lens attachment 100 to form an image 204 on a screen. The object 206 has an aspect ratio which is expressed as the ratio of the object width 208 to the object height 206. This ratio is commonly 1.37:1 for motion picture film and 1.33:1 for video projection devices. The image 204 likewise has an aspect ratio which is the ratio of the image width 212 to the image height 214.

The basic lens 200 produces an image with the same aspect ratio as the object. The addition of the lens attachment 100 allows the system to produce an image where the image aspect ratio differs from the object aspect ratio. The change in aspect ratio from object to image is the anamorphic effect. The anamorphic ratio is the ratio between the image aspect ratio and the object aspect ratio. For example, if the image ratio is 2.34 (Super 35) and the object ratio is 1.33, the anamorphic ratio is 2.34:1.33 or 1.77:1 It will be appreciated that the object must be recorded with a corresponding lens attachment, or otherwise compressed, so that the distortions of recording and reproduction cancel out to produce an undistorted image.

The lens attachment 100 of the invention provides a variable anamorphic ratio. This allows a variety of aspect ratio formats to be recorded or reproduced with a single lens attachment. The basic lens may be a variable focal length (zoom) lens, allowing the area of the object recorded or the size of the image projected to be adjusted without moving the camera or projector. The anamorphic ratio is unaffected by the focal length adjustments of the basic lens.

Figure 2:
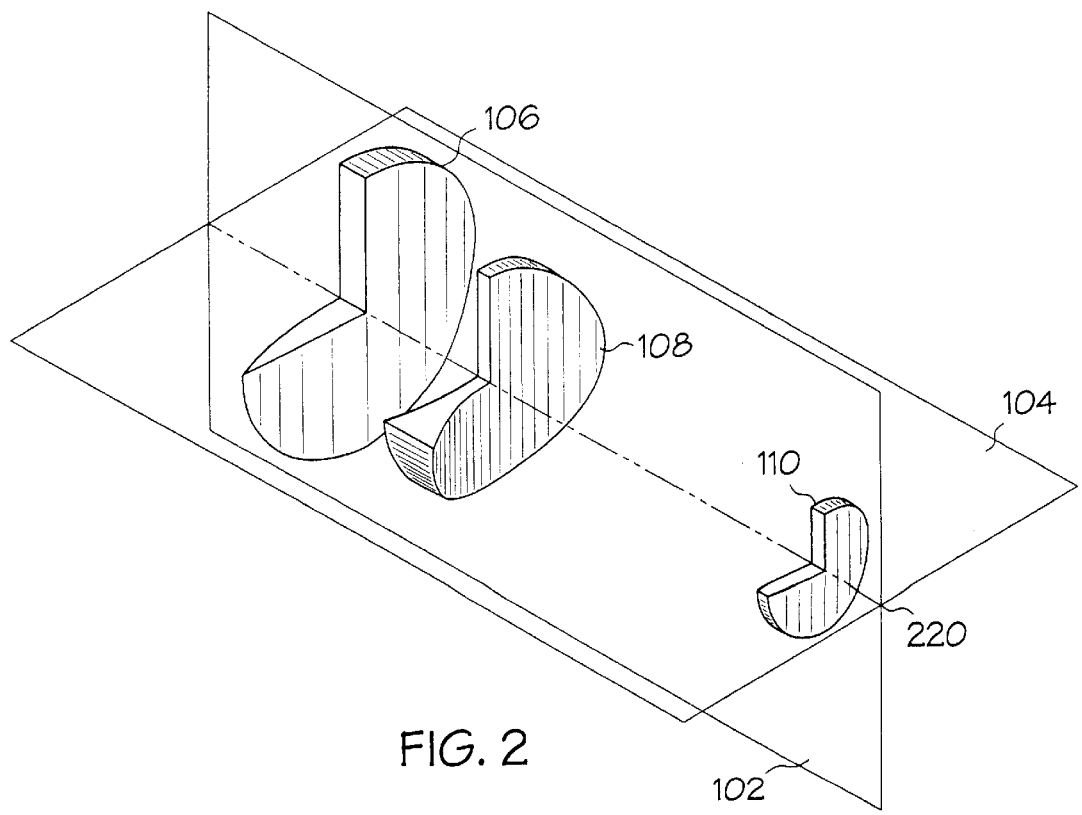
FIG. 2 shows a perspective view of the lens elements in one embodiment of the present invention.

FIG. 2 illustrates the lens elements in an elementary embodiment of a lens attachment according to the present invention. It may be seen that a lens attachment according to the present invention uses lens groups with a cylindrical refractive power. The cylindrical axes are perpendicular to the optical axis 220 of the lens attachment. The cylindrical axes lie in a common plane 102 that includes the optical axis 220 and which is perpendicular to the refractive plane 104 in which the lens groups have the maximum refractive power. Thus the lens attachment has a neutral refractive power along the axis defined by the common plane 102 and a maximum refractive power along the axis defined by the refractive plane 104.

If used for projection, the lenses as illustrated will leave the height of a projected image unaffected and will increase the width of the projected image by the anamorphic ratio.

This embodiment of the lens attachment includes a front lens group 106, a second lens group 108 that is movable along the optical axis 220, and a third lens group 110 that is a fixed distance behind the first lens group. The second lens group is between the first and third lens groups. All lens groups have a neutral refractive power along the axis that lies in the common plane 102. The first and third groups have a positive power along the axis that lies in the refractive plane 104. The second group has a negative power along the axis that lies in the refractive plane 104.

A lens with cylindrical optics introduces an additional design requirement over a lens with spherical optics. A lens in cross-section has two principal points which are points such that a light ray directed at one principal point appears to emerge from the other principal point. A spherical lens is, of course, symmetric about the optical axis and the distance between the principal points is uniform. A cylindrical lens can have a varying distance between the principal points between the plane of neutral refractive power and the plane of maximum refractive power. A lens with cylindrical optics requires balancing the glass thicknesses along the refractive and non-refractive planes to avoid excessive aberrations due to variations in the distances between the principal points in these planes. The following table lists the surface parameters for an embodiment of the lens attachment as shown in FIG. 2:

| I | Radii, mm | Distances, mm | Index of Refraction | Abbe's Number |
|---|---|---|---|---|
| 1 | 381.98569 | 22.258148 | 1.516800 | 64.17 |
| 2 | −1037.65278 | d2, variable | | |
| 3 | −571.26100 | 12.000000 | 1.487490 | 70.40 |
| 4 | 132.05811 | d4 = 394.153335 − d2 | | |
| 5 | −250.25313 | 13.406476 | 1.516800 | 64.17 |
| 6 | −159.22239 | | | |

Indices of refraction and Abbe's number for the helium d line, 587.6 nm.

Figure 3A:
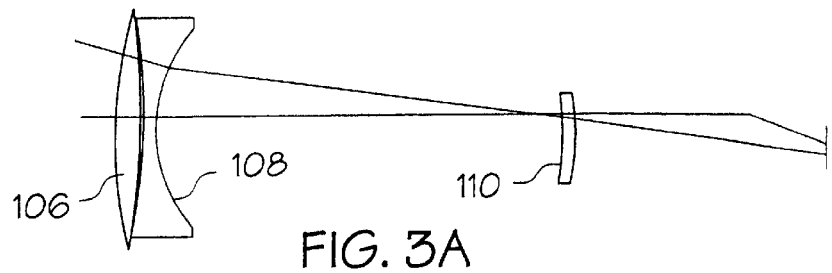
FIGS. 3A–3C show a plan view of the lens elements of FIG. 2 with various positions for the movable lens group.
Figure 3B:
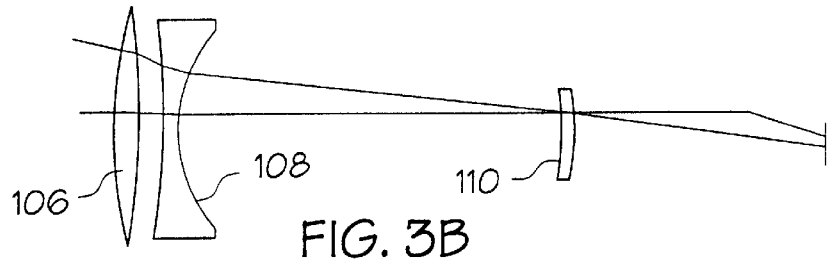
Figure 3C:
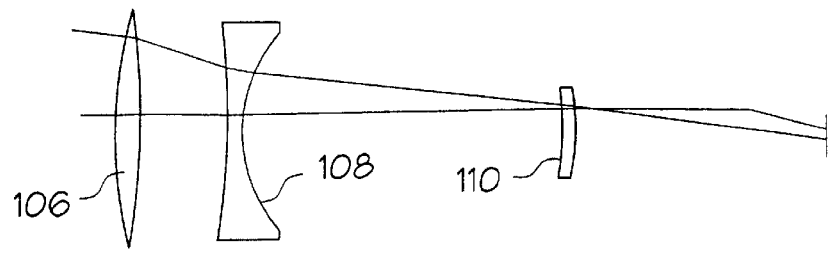

FIGS. 3A to 3C show a plan view, in the refractive plane 104, of the lenses of the embodiment shown in FIG. 2. This embodiment produces an orphic ratio of about 2:1 when the second lens group 108 is the furthest forward position, d2=3.5 mm, as shown in FIG. 3A. In the middle position, d2=37 mm, shown in FIG. 3B, the anamorphic ratio is about 1.77:1, and in the rearmost position, d2=100.9 mm, FIG. 3C, the ratio is about 1.33:1.

In this embodiment, the first lens group 106 is a double convex lens with a focal length of about 641 mm. The third lens group 110 is a positive meniscus with a focal length of about 803 mm. The second lens group 108 is a double concave lens with a focal length of about −218 mm. The third lens group 110 is located at a fixed distance behind the first lens group 106. The second lens group is movable along the optical axis 220 of the lens attachment between the first 106 and the third 110 lens groups to control the anamorphic ratio. All the lens elements are cylindrical in form with the axes of the cylinders lying in the common plane 102. The lens elements of each group work together to provide a maximum refractive power in the refractive plane 104.

The lens groups in this embodiment are all simple lenses. Therefore, there is no correction of chromatic aberrations in this embodiment. The performance of this lens is satisfactory only for use with monochromatic light. The anamorphic ratio is controlled by the position of the second lens group 108. In this embodiment, the relationship between the position of the second lens group 108 and the anamorphic ratio is distinctly nonlinear.

Figure 4:
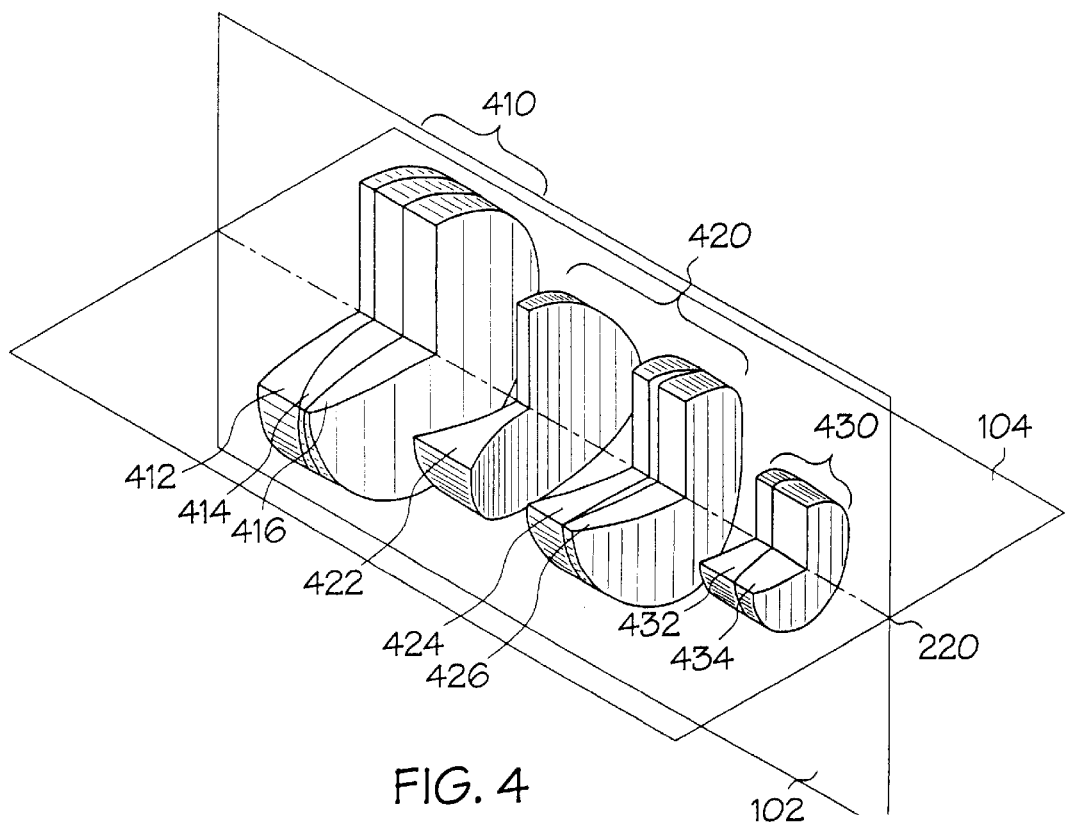
FIG. 4 shows a perspective view of the lens elements in another embodiment of the present invention.

FIG. 4 illustrates the lens elements in a second embodiment of a lens attachment according to the present invention. The lens groups of the second embodiment include multiple lens elements. The lens groups of the second embodiment have substantially the same arrangement as the lens groups of the elementary embodiment. An attachment using the lenses of the second embodiment performs similarly to an attachment using the lenses of the elementary embodiment. However, the second embodiment provides correction of chromatic aberration and the relationship between the position of the second lens group 420 and the anamorphic ratio is more nearly linear. The lenses of the second embodiment are particularly suited for use in a projection lens attachment. The following table lists the surface parameters for the second embodiment of the lens attachment:

| I | Radii, mm | Distances, mm | Index of Refraction | Abbe's Number |
|---|-----------|---------------|---------------------|---------------|
| 1 | 550.30370 | 12.000000 | 1.682727 | 44.50 |
| 2 | 165.40480 | 26.500000 | 1.487490 | 70.40 |
| 3 | 386.13080 | 28.000000 | 1.670031 | 47.11 |
| 4 | −594.99500 | d4, variable | | |
| 5 | −174.77740 | 12.382984 | 1.487490 | 70.40 |
| 6 | 136.37260 | 74.957946 | | |
| 7 | −179.52720 | 15.000000 | 1.487490 | 70.40 |
| 8 | Infinite | 7.170000 | | |
| 9 | −355.93782 | 25.000000 | 1.749502 | 34.95 |
| 10 | −131.39420 | d10 = 220.318493 − d4 | | |
| 11 | −248.04370 | 15.000000 | 1.603420 | 38.03 |
| 12 | 127.17780 | 32.000000 | 1.622990 | 58.06 |
| 13 | −209.77860 | | | |

Indices of refraction and Abbe's number for the helium d line, 587.6 nm.

Figure 5A:
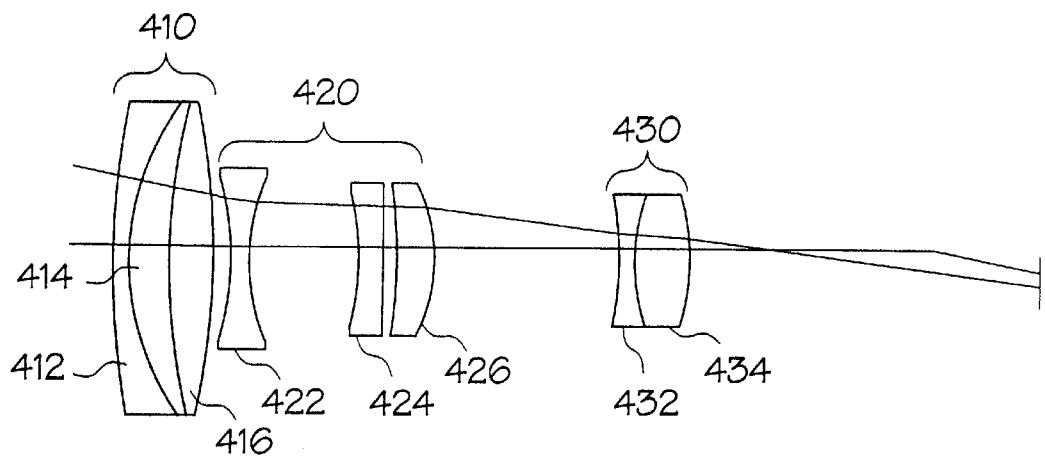
FIGS. 5A–5C show a plan view of the lens elements of FIG. 4 with various positions for the movable lens group.
Figure 5B:
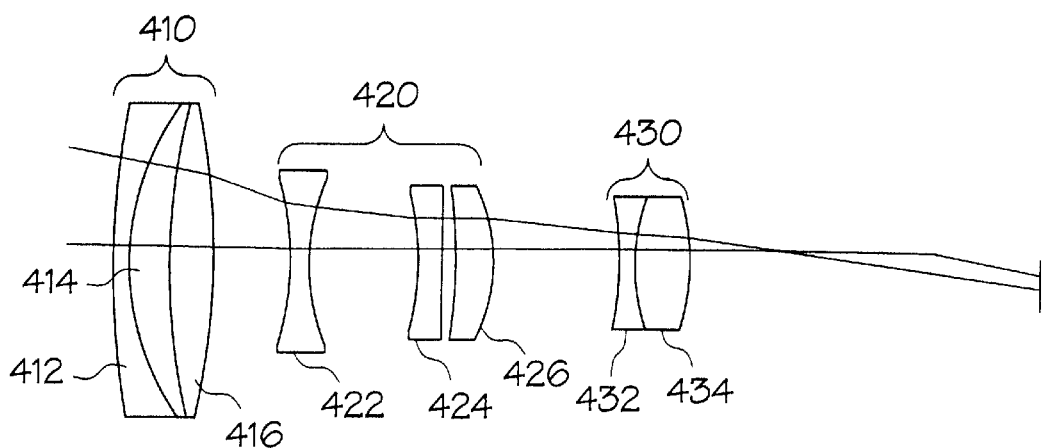
Figure 5C:
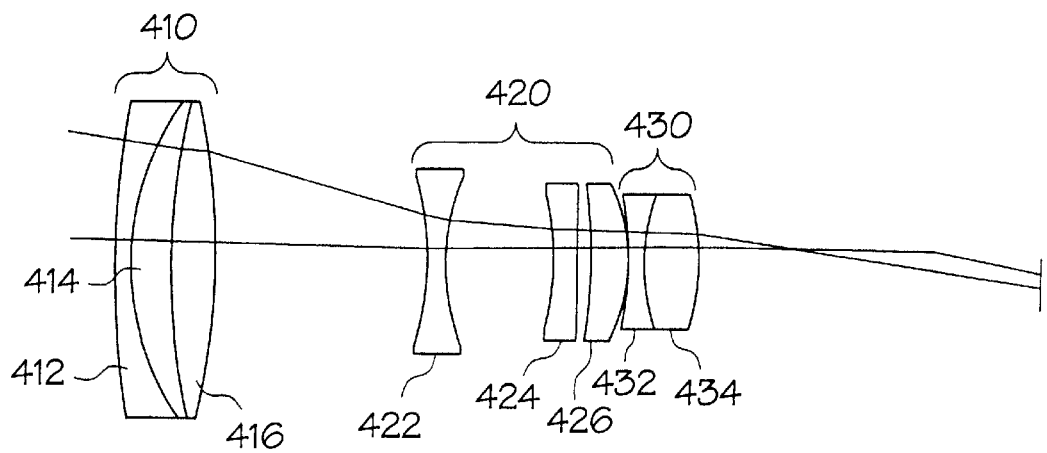
Figure 6:
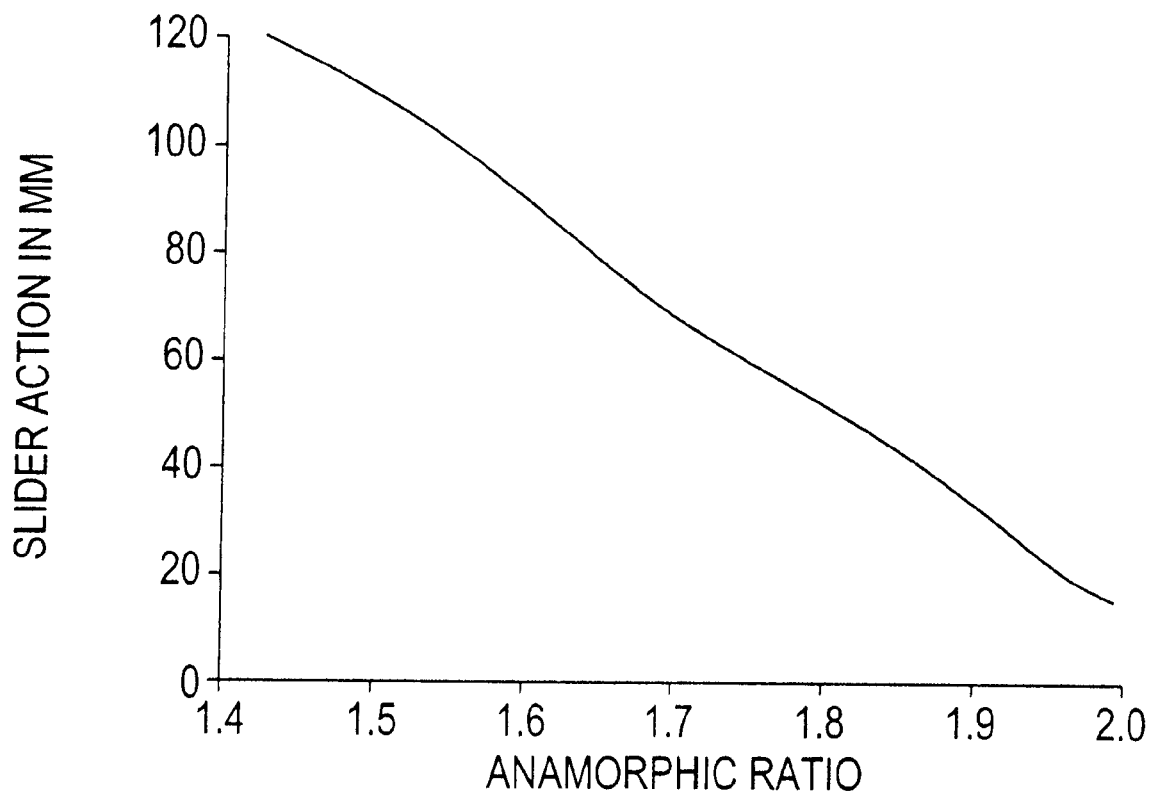
FIG. 6 shows the relationship between the position of the moveable lens group and the anamorphic ratio.

This embodiment produces an anamorphic ratio of about 2:1 when the second lens group 420 is the furthest forward position, d4=15 mm, as shown in FIG. 5A. In the middle position, d4=57.1 mm, shown in FIG. 5B, the anamorphic ratio is about 1.77:1, and in the rearmost position, d10=2 mm, FIG. 5C, the ratio is about 1.33:1. FIG. 6 illustrates the relationship between the position of the second lens group 420, represented by the vertical axis, and the anamorphic ratio, represented by the horizontal axis. It will be observed that the relationship is approximately linear.

In this embodiment, the first lens group 410 includes a negative front lens element 412, a positive middle lens element 414, and a positive rear lens 416 element. These three lenses form a cemented triplet 410 consisting of a front negative meniscus 412, a middle positive meniscus 414, and a rear double convex lens 416. The second lens group 420 includes a negative front lens element 422, a negative middle lens element 424, and a positive rear lens element 426. These three lenses form an air spaced triplet 420 consisting of a front double concave lens 422, a middle piano concave lens 424, and a positive meniscus 426. The third lens group 430 includes a negative front lens element 432 and a positive rear lens element 434. These two lenses form a cemented doublet 430 consisting of a front double concave lens 432 and a rear double convex lens 434. The third lens group 430 is located at a fixed distance behind the first lens group 110. The second lens group is movable along the optical axis 102 of the lens attachment between the first 410 and the third 430 lens groups to control the anamorphic ratio. All the lens elements are cylindrical in form with the axes of the cylinders lying in the common plane. The lens elements of each group work together to provide a maximum refractive power with an axis lying in the refractive plane.

Figure 7A:
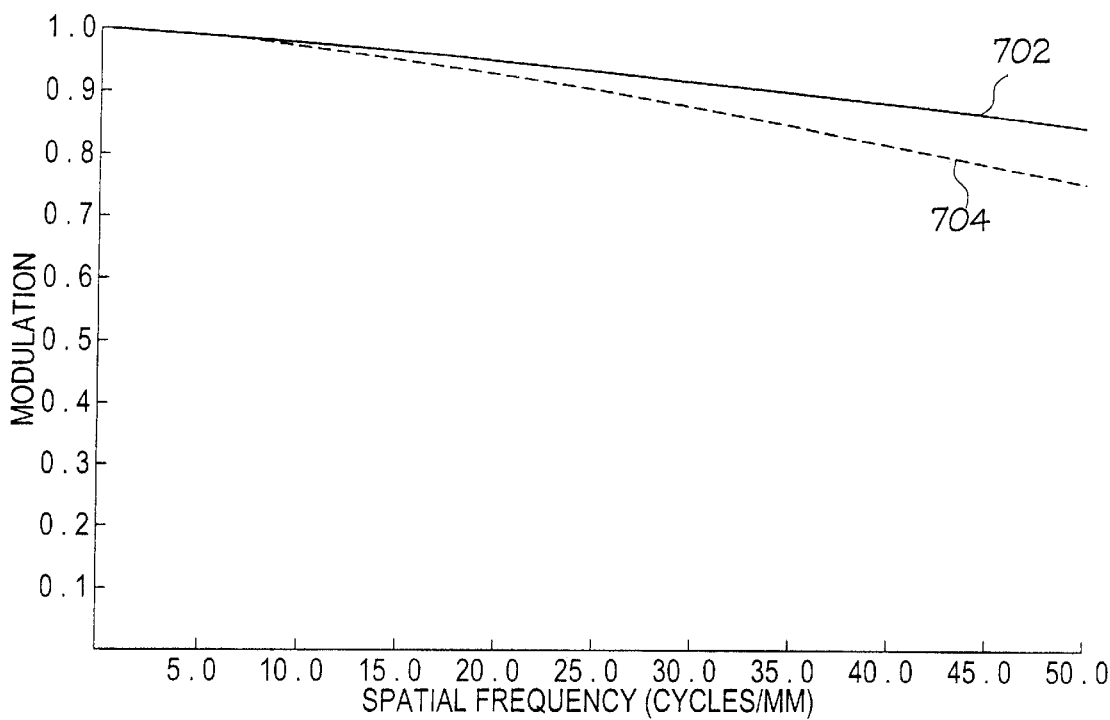
FIGS. 7A–7C show plots of the MTF for the lens attachment shown in FIGS. 5A–5C.
Figure 7B:
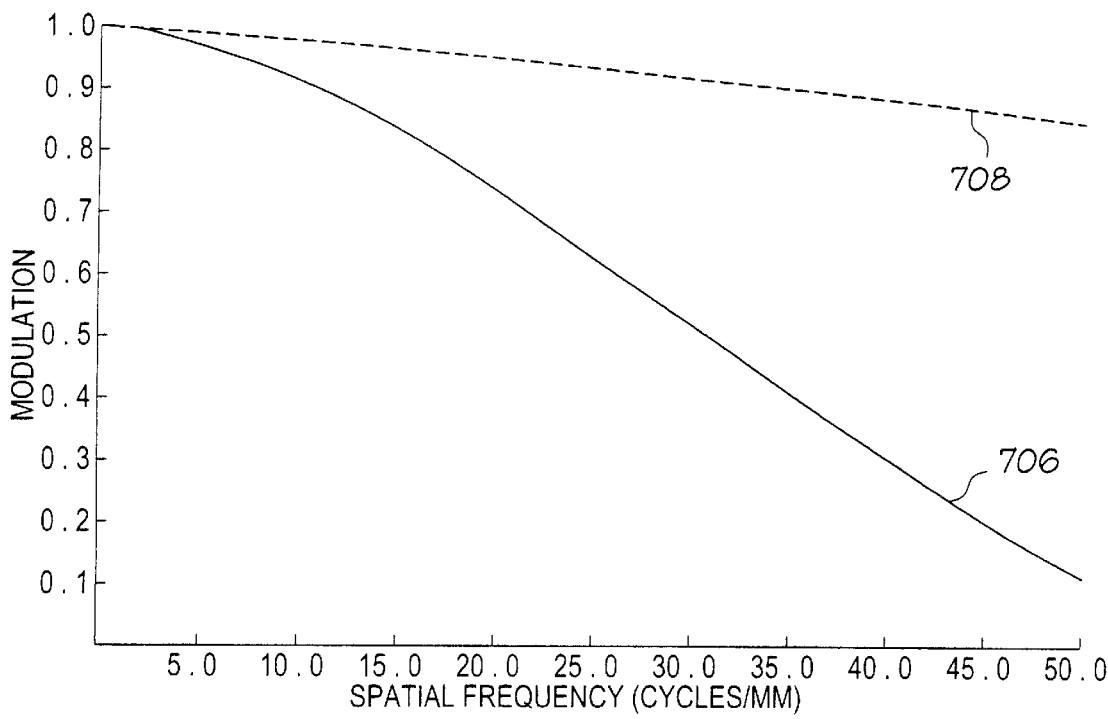
Figure 7C:
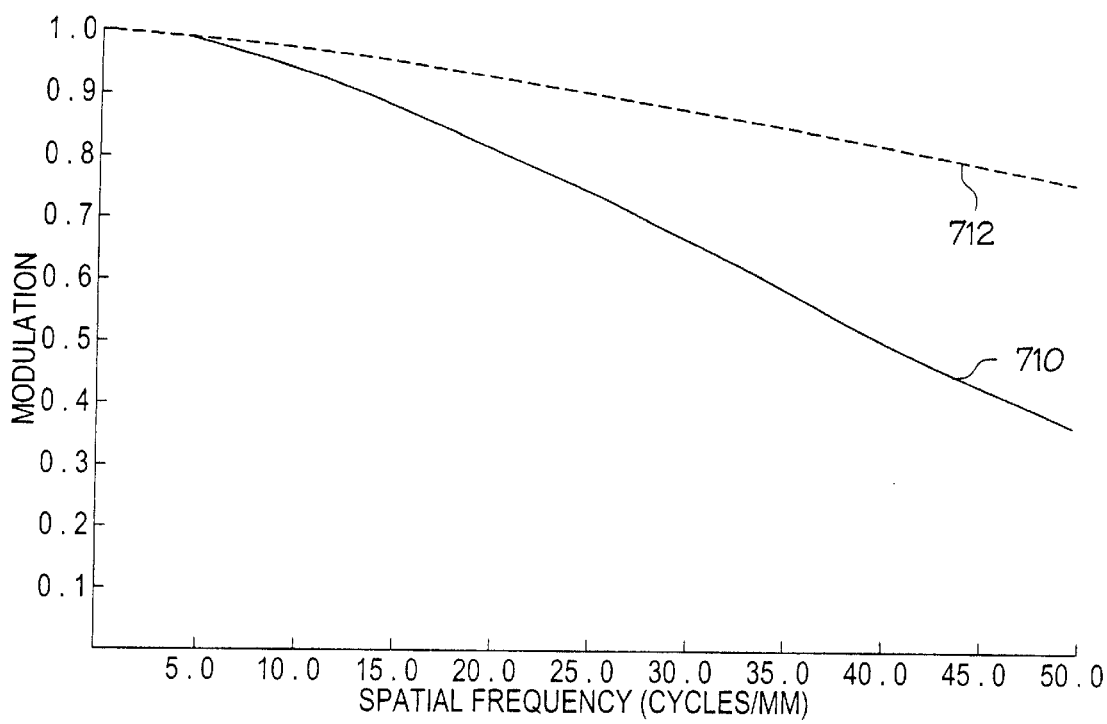

The second embodiment of the lens attachment is designed to work with a basic lens that is a projection zoom lens having a focal length that varies from about 70 to 121 mm and has an f number of about 2.9. The image quality of this embodiment of the lens attachment was evaluated assuming the basic lens was a perfect lens projecting an image a distance of 44 feet, operating with a focal length setting that produced an image 8 feet high. Without the anamorphic lens attachment, the projected width would be about 10.7 feet. The modulation transfer function (MTF) was computed for the lens attachment at three anamorphic ratio settings, 2.00:1, 1.77:1, and 1.33:1. These settings produce projected widths of about 21.3 feet, 19.1 feet, and 14.2 feet respectively. The MTFs for this embodiment are shown in FIGS. 7A to 7C for the horizontal direction, at the center and at the corner of the screen, for each of the three anamorphic ratios. It may be observed that the MTFs are best for the 2:00:1 anamorphic ratio shown in FIG. 7A, with the solid line 702 being the MTF at the center and the dashed line 704 the MTF at the corner. This is because the design of this embodiment was more heavily weighted toward that ratio. Alternate embodiments may weight the design toward other anamorphic ratios and have relative MTFs that are better for those ratios. FIG. 7B shows the MTFs for the 1.77:1 anamorphic ratio, with the solid line 706 being the MTF at the center and the dashed line 708 the MTF at the corner. FIG. 7C is for the 1.33 anamorphic ratio, with the solid line 710 being MTF at the center and the dashed line 712 the MTF at the corner.

A third embodiment of a lens attachment according to the present invention is shown in FIG. 8. The following table lists the surface parameters for this embodiment:

| I | Radii, mm | Distances, mm | Index of Refraction | Abbe's Number |
|---|-----------|---------------|---------------------|---------------|
| 1 | 1455.79086 | 12.000000 | 1.755201 | 27.58 |
| 2 | 131.98181 | 12.112918 | 1.551149 | 49.64 |
| 3 | 150.69777 | d3, variable | | |
| 4 | 190.67104 | 29.898782 | 1.728250 | 28.41 |
| 5 | −259.97066 | d5, variable | | |
| 6 | −289.68436 | 12.000000 | 1.516800 | 64.17 |
| 7 | 99.98129 | 14.000000 | | |
| 8 | 110.66977 | 15.731662 | 1.636359 | 35.34 |
| 9 | 250.38951 | d9 = 287.01294 − d3 − d5 | | |
| 10 | −488.92414 | 15.000000 | 1.672698 | 32.21 |
| 11 | 46.83996 | 22.243695 | 1.522489 | 59.48 |
| 12 | −237.77178 | 5.000000 | | |

Figure 8A:
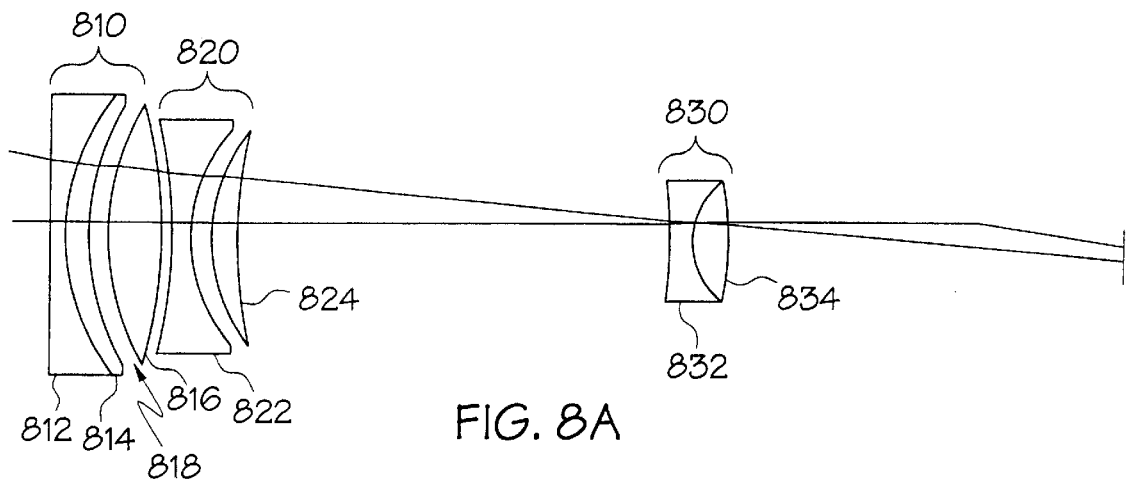
FIGS. 8A–8C show a plan view of a third embodiment of the lens attachment with various positions for the movable lens group and movable lens element.
Figure 8B:
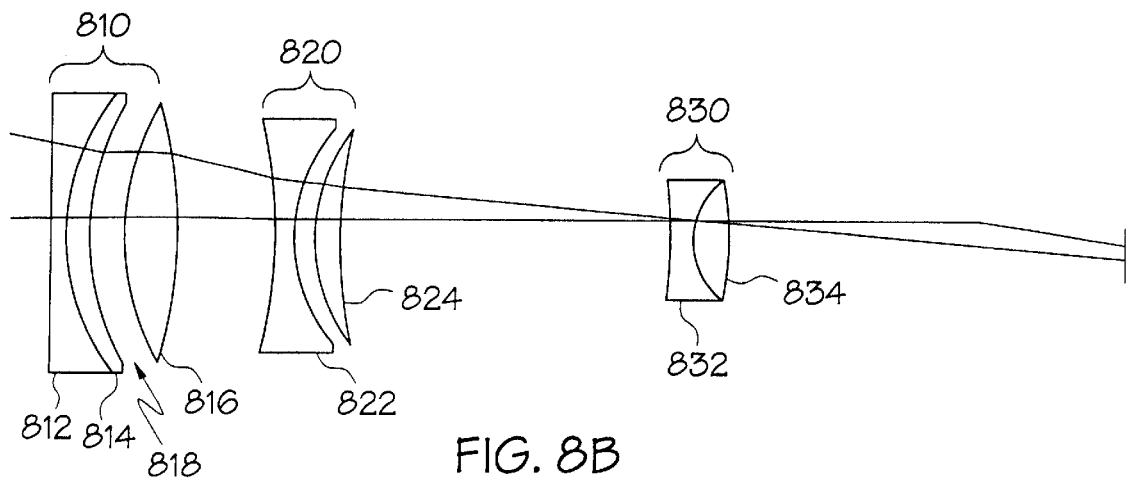
Figure 8C:
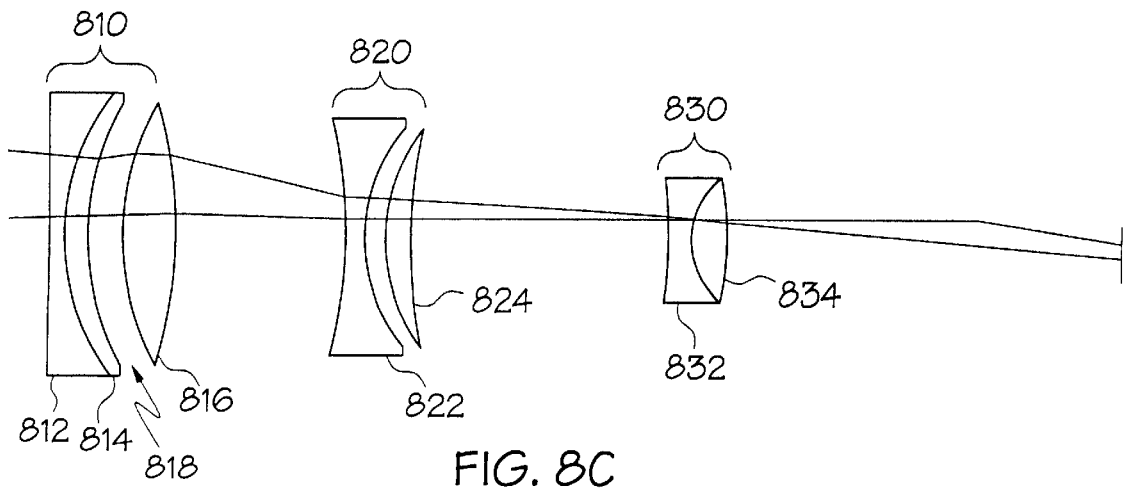

This embodiment produces an anamorphic ratio of about 2:1 when the second lens group 320 is the furthest forward position, d9=265.4 mm, as shown in FIG. 8A. In the middle position, d9=195 mm, shown in FIG. 8B, the anamorphic ratio is about 1.77:1, and in the rearmost position, d9=147.7 mm, FIG. 8C, the ratio is about 1.33:1.

In this embodiment, the first lens group 810 includes a negative front lens element 812, a positive middle lens element 814, and a positive rear 816 element. The forward two lenses form a cemented front doublet consisting of a front negative meniscus 812 and a middle positive meniscus 814. The rear lens is a double convex lens 816 separated from the cemented front doublet by a variable air space 818. The variable air space 818 is adjusted to correct residual aberrations responsive to movement of the second lens group 820. The variable air space 818 is 16.578 mm in the configuration shown in FIG. 8A, 27.237 mm in FIG. 8B, and 27.939 mm in FIG. 8C. The second lens group 820 includes a negative front lens element 822 and a positive rear lens element 824. These two lenses form an air spaced doublet 820 consisting of a front double concave lens 822 and a positive meniscus 824. The third lens group 830 includes a negative front lens element 832 and a positive rear lens element 834. These two lenses form a cemented doublet 830 consisting of a front double concave lens 832 and a rear double convex lens 834. The third lens group 830 is located at a fixed distance behind the fixed lens elements 812, 814 of the first lens group 810. The second lens group 820 is movable along the optical axis of the lens attachment between the first 810 and the third 830 lens groups to control the anamorphic ratio. All the lens elements are cylindrical in form with the axes of the cylinders lying in a common plane. The lens elements of each group work together to provide a maximum refractive power with an axis lying in the refractive plane.

Figure 9A:
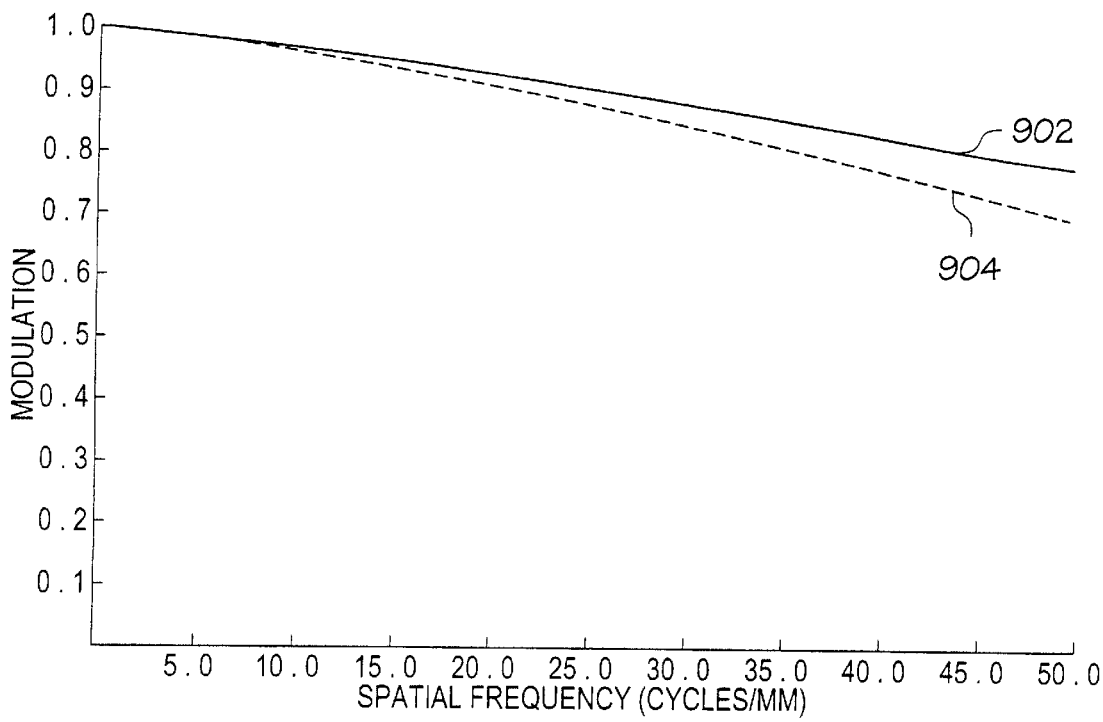
FIGS. 9A–9C show plots of the MTF for the lens attachment shown in FIGS. 8A–8C.
Figure 9B:
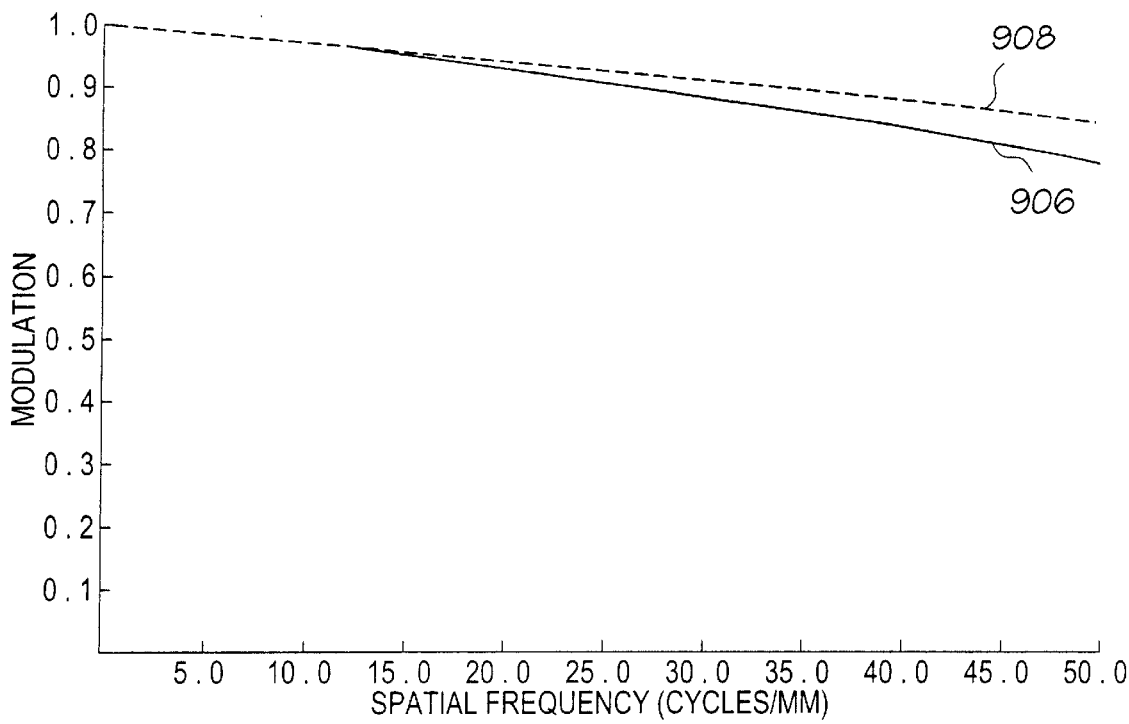
Figure 9C:
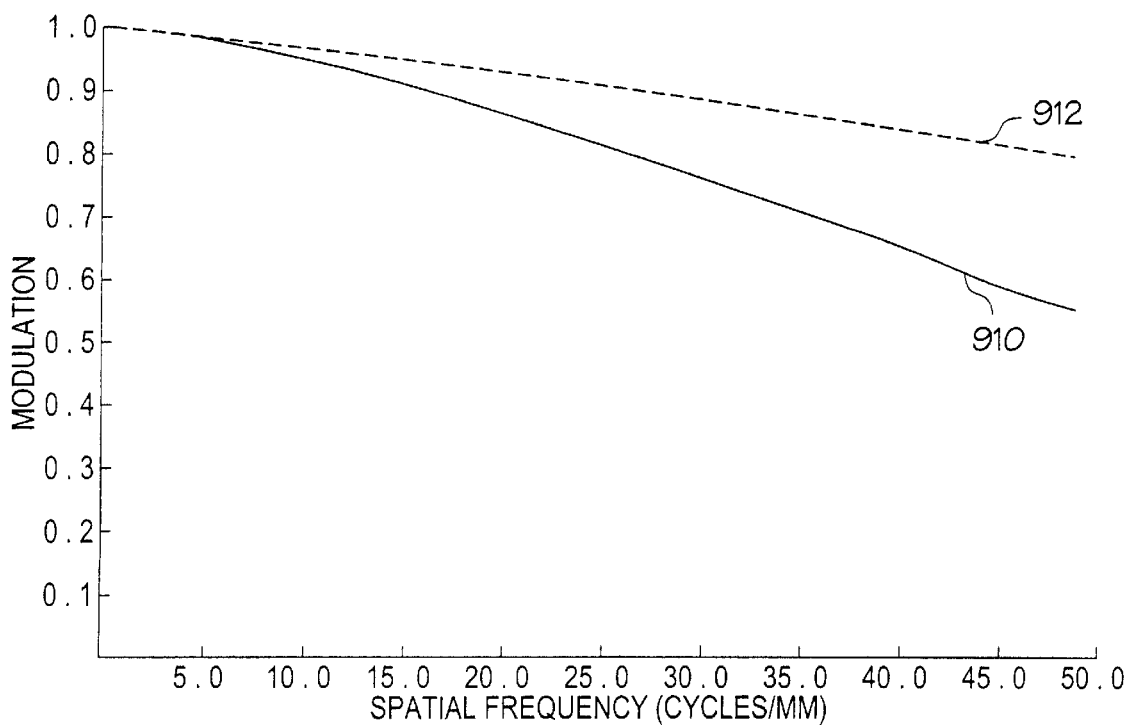

This embodiment of the lens attachment is designed to work with the same basic lens as the previous embodiment. The image quality of this embodiment of the lens attachment was evaluated under the same conditions as the previous embodiment and the resulting MTFs are shown in FIGS. 9A to 9C. FIG. 9A shows the MTFs for the 2.00:1 anamorphic ratio, with the solid line 902 being the MTF at the center and the dashed line 904 the MTF at the corner. FIG. 9B shows the MTFs for the 1.77:1 anamorphic ratio, with the solid line 906 being the MTF at the center and the dashed line 908 the MTF at the corner. FIG. 9C is for the 1.33 anamorphic ratio, with the solid line 910 being the MTF at the center and the dashed line 912 the MTF at the corner A projector in a theatre is typically located above the centerline of the screen so that projection is above the heads of the audience. This requires that the projector be aimed down at the screen and produces a keystone distortion causing the image at the bottom of the screen to be wider than at the top. Some projectors allow the basic lens to be decentered relative to the image. This allows the image to be lowered relative to the optical axis of the basic lens without keystone distortion. The above lens attachments were evaluated for a basic lens shift sufficient to lower the projected image by one foot and image quality remained satisfactory.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. An anamorphic lens attachment to be used in conjunction with a basic lens, said attachment comprising:
   a first lens group having positive refractive power in a first direction;
   a second lens group having negative refractive power in the first direction, said second group movably located between the first lens group and the basic lens; and
   a third lens group having positive refractive power in the first direction, said third group located between the second lens group and the basic lens at a fixed distance from the first lens group;
   wherein, said lens groups of said attachment have neutral refractive power in a second direction substantially perpendicular to the first direction.

2. The attachment of claim 1 wherein said first lens group includes a negative front lens element and a positive rear lens element.

3. The attachment of claim 2 wherein said first lens group further includes a positive middle lens element.

4. The attachment of claim 1 wherein said first lens group is a cemented triplet consisting of a front negative meniscus, a middle positive meniscus, and a rear double convex lens.

5. The attachment of claim 1 wherein said first lens group is a cemented front doublet and a rear double convex lens, said cemented front doublet consisting of a front negative meniscus and a middle positive meniscus, said rear double convex lens separated from the cemented front doublet by a variable air space.

6. The attachment of claim 1 wherein said second lens group includes a negative front lens element and a positive rear lens element.

7. The attachment of claim 6 wherein said second lens group further includes a negative middle lens element.

8. The attachment of claim 1 wherein said second lens group is an air spaced triplet consisting of a front double concave lens, a middle piano concave lens, and a positive meniscus.

9. The attachment of claim 1 wherein said second lens group is an air spaced doublet consisting of a front double concave lens and a positive meniscus.

10. The attachment of claim 1 wherein said third lens group includes a negative front lens element and a positive rear lens element.

11. The attachment of claim 1 wherein said third lens group is a cemented doublet consisting of a front double concave lens and a rear double convex lens.

12. The attachment of claim 1 wherein the attachment produces an anamorphic ratio of about 2 when the second lens group is adjacent the first lens group.

13. The attachment of claim 1 wherein the attachment produces an anamorphic ratio of less than 1.5 when the second lens group is adjacent the third lens group.

14. An anamorphic lens system comprising:
   a basic lens having a uniform positive refractive power;
   a first lens group having positive refractive power in a first direction, said first lens group located in front of the basic lens;
   a second lens group having negative refractive power in the first direction, said second group movably located between the first lens group and the basic lens; and
   a third lens group having positive refractive power in the first direction, said third group located between the second lens group and the basic lens at a fixed distance from the first lens group;
   wherein, said lens groups of said attachment have neutral refractive power in a second direction substantially perpendicular to the first direction.

15. The system of claim 14 wherein said first lens group includes a negative front lens element, a positive middle lens element, and a positive rear lens element.

16. The system of claim 14 wherein said second lens group includes a negative front lens element, a negative middle lens element, and a positive rear lens element.

17. The system of claim 14 wherein said third lens group includes a negative front lens element and a positive rear lens element.

18. The system of claim 14 wherein the system produces an anamorphic ratio of about 2 when the second lens group is adjacent the first lens group.

19. The system of claim 14 wherein the system produces an anamorphic ratio of less than 1.5 when the second lens group is adjacent the third lens group.

20. The system of claim 14 wherein the basic lens has a variable focal length.

* * * * *